United States Patent
Wang et al.

(10) Patent No.: US 6,423,240 B1
(45) Date of Patent: Jul. 23, 2002

(54) PROCESS TO TUNE THE SLIDER TRAILING EDGE PROFILE

(75) Inventors: Benjamin Wang; Cherngye Hwang, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/479,859

(22) Filed: Jan. 7, 2000

(51) Int. Cl.$^7$ ................................................. G11B 5/60
(52) U.S. Cl. .............................. 216/22; 216/52; 216/66; 216/72; 216/75; 216/76; 216/77; 204/192.34; 29/603.15; 29/603.16
(58) Field of Search .......................... 216/22, 52, 66, 216/88, 75, 76, 77, 72; 204/192.34; 29/603.12, 603.15, 603.16

(56) References Cited

U.S. PATENT DOCUMENTS

| | | | |
|---|---|---|---|
| 4,130,847 A | 12/1978 | Head et al. ................. 360/122 |
| 4,333,229 A | 6/1982 | Ellenberger .................. 29/603 |
| 4,855,854 A | 8/1989 | Wada et al. ................. 360/126 |
| 4,893,203 A | 1/1990 | Ezaki et al. ................. 360/103 |
| 4,894,740 A | 1/1990 | Chhabra et al. ............. 360/103 |
| 5,146,379 A | 9/1992 | Iwata et al. ................. 360/126 |
| 5,198,934 A | 3/1993 | Kubo et al. .................. 360/104 |
| 5,271,802 A | 12/1993 | Chang et al. ................ 156/643 |
| 5,321,882 A | 6/1994 | Zarouri et al. ................ 29/603 |
| 5,323,283 A | 6/1994 | Sano .......................... 360/126 |
| 5,520,716 A | 5/1996 | Takagi et al. ................. 75/235 |
| 5,635,082 A | 6/1997 | Yamamoto et al. ........... 216/22 |
| 5,650,893 A | 7/1997 | Bolasna et al. .............. 360/103 |
| 5,652,687 A | 7/1997 | Chen et al. .................. 360/126 |
| 5,687,045 A | 11/1997 | Okai et al. ................... 360/126 |
| 5,761,790 A | 6/1998 | Carr et al. ................ 29/603.15 |
| 5,764,454 A | 6/1998 | Hishida ....................... 360/126 |
| 5,909,340 A | * 6/1999 | Lairs et al. .................. 360/104 |
| 6,054,023 A | * 4/2000 | Chang et al. ............. 204/192.2 |
| 6,069,775 A | * 5/2000 | Chang et al. ............... 360/126 |
| 6,212,047 B1 | * 4/2001 | Payne et al. ............... 360/318.1 |

FOREIGN PATENT DOCUMENTS

JP          60136025          7/1985

OTHER PUBLICATIONS

Abstract of RD338049; Jun. 10, 1992.

\* cited by examiner

*Primary Examiner*—Anita Alanko
(74) *Attorney, Agent, or Firm*—Robert B. Martin; Bracewell & Patterson, L.L.P.

(57) ABSTRACT

A method of altering the topography of a trailing edge of a slider is disclosed, the slider having a substrate surface, at least one magnetic recording head imbedded in an alumina undercoat, and a vertical axis relative to the substrate surface. The steps include first applying an alumina overcoat to at least the trailing edge, followed by lapping at least the trailing edge of the slider. The slider (or sliders) is then placed on a pallet that rotates, exposing the trailing edge to an ion beam. The ion beam is generated using an etchant gas such as Argon, or a mixture of gases such as Argon and Hydrogen, or Argon and $CHF_3$. The trailing edge (or trailing edges) are then exposed at least once to the ion beam at a predetermined milling angle and predetermined time, the milling angle being the angle made by the ion beam relative to the vertical axis. The milling angle is typically between 0° and 85°.

19 Claims, 5 Drawing Sheets

PROCESS TO TUNE THE SLIDER TRAILING EDGE PROFILE

CROSS-REFERENCE TO RELATED APPLICATION

The present application is related to copending application entitled "Method of Improving the Reliability of Magnetic Head Sensors by Ion Milling Smoothing" by inventors Richard T. Campbell, Richard Hsiao, Yiping Hsiao, Son V. Nguyen, and Thao J. Pham filed concurrently with the present application, herein incorporated by reference.

BACKGROUND OF THE INVENTION

1. Technical Field

The present invention generally relates to an improved method for manufacturing sliders for magnetic recording heads, and in particular to the ion milling of the trailing edge of the slider. Still more particularly, the present invention relates to the use of ion milling over the entire slider or with the slider masked except for the trailing edge in order to change the topography of the trailing edge.

2. Description of the Related Art

Digital magnetic recording devices for data storage generally comprise a thin film magnetic recording disk and a head which is moved above the surface of the rotating disk to electromagnetically read and write information on the disk. Advanced thin film magnetic recording disks generally comprise a rigid substrate, a magnetic layer such as a cobalt-based metal alloy, a protective amorphous carbon layer and a lubricant layer, such as perfluoropolyether disposed on the carbon overcoat.

During operation of the disk drive system, an actuator mechanism moves the magnetic transducer to a desired radial position on the surface of the rotating disk where the head electromagnetically reads or writes data. Usually, the head is integrally mounted in a carrier or support referred to as a "slider". The slider is generally rectangular in shape and consists of two portions: a substrate portion and a head portion formed on an end face of the slider portion. Typically, this end face of the slider will constitute the slider trailing edge when the slider is suspended adjacent to a rotating recording disk.

The substrate portion of the slider can be made from ceramic material such as $Al_2O_3$—TiC, silicon carbide, zirconium oxide, or other suitable material. The head portion of the slider is typically a thin layer of alumina ($Al_2O_3$), or alumina overcoat, formed on the trailing edge face of the slider in which the magnetic portion of the head is embedded. The slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirable contacting the disk.

Typically, a slider is formed with an aerodynamic pattern of protrusions (air bearing design) on its air bearing surface ("ABS"), or substrate surface, which enables the slider to fly at a constant height close to the disk during operation of the disk drive. The recording density of the magnetic disk drive system is dependent upon the distance between a transducer and the magnetic media. One goal of the air bearing slider design is to "fly" a slider as closely as possible to a magnetic medium while avoiding physical impact with the medium. Smaller spacings, or "fly heights", are desired so that the transducer can distinguish between the varying magnetic fields emanating from closely spaced regions on the disk.

However, the benefit of closer spacing is contrasted by the adverse effect on the mechanical reliability of the slider. As the distance between the slider and the disk decreases, as it does with every generation of storage device, the probability of contact between the two surfaces increases, thus causing wear on both contacting surfaces that could ultimately lead to loss of data. The probability of contact between the slider and disk increases when any part of the trailing edge protrudes above the air bearing surface of the slider. Further, the amount of exposure that certain transducer parts such as the read head face can influence its performance. Ideally, the read head should be flush with the alumina material making up the slider surface. Thus, the precise topography surrounding the transducers is vital to the performance of the slider read/write head.

In the manufacturing of the sliders, the lapping process determines the final trailing edge topography of the slider. However, the desired profile may be different from what results from the lapping process. More particularly, it is often desirable to change the heights of the magnetic recording heads relative to the substrate. Making the recording heads lower in height relative to the substrate surface of the slider would be ideal, protecting the heads from physical contact with the disks moving below (or above) them. Thus, it would be beneficial to tailor the trailing edge profile to any defined shape. The present invention is directed towards such means of tailoring a trailing edge profile through the use of ion milling.

SUMMARY OF THE INVENTION

It is therefore one object of the present invention to provide a method of altering the topography of the trailing edge of a slider.

It is another object of the present invention to provide a method of decreasing the likelihood of physical contact between a moving disk and the magnetic recording heads of the slider.

It is yet another object of the present invention to improve the thermal asperity characteristics of the magnetic recording heads of a slider.

It is yet another object of the present invention to provide for a two-step process of altering the topography of the slider trailing edge in a first step, and then removing a thin layer of material to clean the trailing edge surface, thus allowing a carbon coating to better adhere to the trailing edge.

The foregoing objects are achieved as is now described, wherein ion milling is used to alter the topography of a trailing edge of a slider, the slider having a substrate surface, at least one magnetic recording head imbedded in an alumina undercoat, and a vertical axis relative to the substrate surface. The steps include first applying an alumina overcoat to at least the trailing edge, followed by lapping at least the trailing edge of the slider. The slider (or sliders) is then placed on a pallet that rotates, exposing the trailing edge to an ion beam. The ion beam is generated using an etchant gas such as Argon, or a mixture of gases such as Argon and Hydrogen, or Argon and $CHF_3$. The trailing edge (or trailing edges) are then exposed at least once to the ion beam at a predetermined milling angle and predetermined time, the milling angle being the angle made by the ion beam relative to the vertical axis of the slider. The milling angle is typically between about 0° and 85°, and 0° and −85° (hereinafter, reference to a range of angles always inherently includes the negative range, unless otherwise stated. Thus, reference to a range of "0° and 50°" means −50° and +50°, and reference to the range "70° to 85°" means −70° to −85° and +70° to +85°).

If it is necessary to lower the levels of the magnetic recording head material to produce the desired topography on the trailing edge, a milling angle of between 0° and 50° is chosen, wherein the magnetic recording head material is typically etched away to a greater extent than the alumina undercoat and alumina overcoat. If changes in the topography of the alumina undercoat and/or alumina overcoat are desired such as to clean the surface in preparation for a subsequent carbon or polymer coating, a milling angle of between 70° and 85° is chosen. The larger milling angles will tend to differentially mill away the alumina material to a greater extent than the head material.

Various parameters can be manipulated to alter the ion milling properties of the method. The milling angle, time of exposure, and power level of the ion generating source and identity of the etchant gas can all be individually manipulated or manipulated together.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
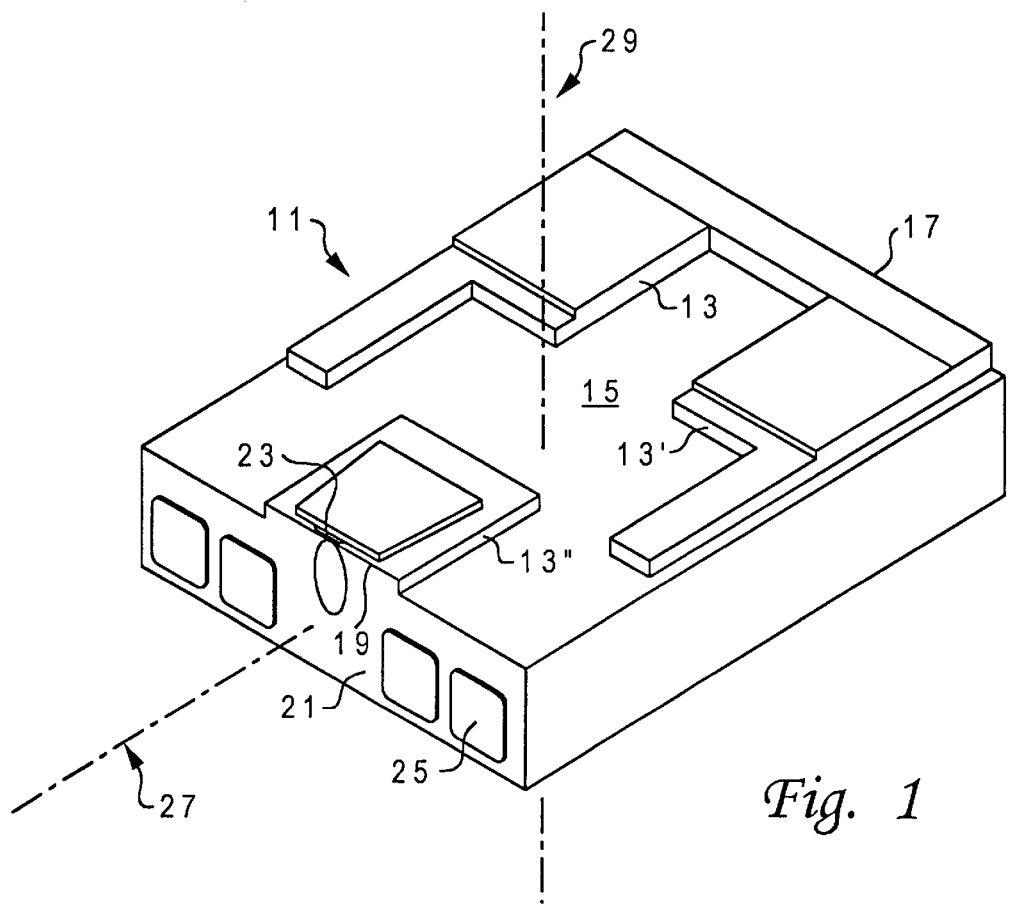
FIG. 1 depicts details of a finished slider in accordance with a preferred embodiment of the present invention.

With reference now to the figures, and in particular with reference to FIG. 1, there is shown a typical finished thin film head slider 11 with a negative pressure ABS. The slider 11 is generally rectangular in shape and has a complex topography. It consists of two portions: a substrate portion and a head portion, the head being formed on an end face of the slider portion. Typically, this end face of the slider constitutes the slider trailing surface when the slider is suspended adjacent to a rotating recording disk.

The substrate portion of the slider (often referred to as the ABS), which constitutes the bulk of the finished thin film head slider 11, is typically made of a ceramic material such as $Al_2O_3$—TiC or other suitable material. The substrate surface 15 is the surface on which most of the various features of the slider are located. In one embodiment shown in FIG. 1, the slider comprises, as shown, three dual-depth step pads 13, 13', and 13" disposed on a recessed substrate surface 15 of the finished slider 11. The two step pads are at the leading edge 17 and one is at the trailing edge 19. The trailing edge 19 is located on the substrate surface 15, adjacent to the deposited end 21. Magnetic materials and alumina is deposited on the end 21. The head 23 is suitably located on the single step pad 13" near the deposited end 21 of the slider 11. The step pads 13, 13' and 13" and the substrate surface 15, the surface 15 being recessed relative to the step pads, are all structural features which enable the head 23 to glide or "fly" at a short distance above the surface of a rotating magnetic disk. A variety of other ABS designs are known in the art, as disclosed in U.S. Pat. No. 5,650,893 (for negative pressure design) and U.S. Pat. No. 4,894,740 (for positive pressure design), the disclosures of which are incorporated herein by reference.

Referring still to FIG. 1, the head 23 is typically formed in a thin layer of alumina deposited on the trailing edge 19 of the slider. Suitably, it is a magnetoresistive read element and an inductive element for writing data. Electrical terminal pads 25 provide electrical connection for the magnetic head elements. The slider 11 has a vertical axis 29 relative to the substrate surface 15 and a horizontal axis 27 that is perpendicular to the axis 29.

The method of making the head elements is well known in the art. The several magnetic recording heads (shields, poletips, read head) are first deposited onto the substrate of the sliders. Hereinafter, shields, poletips, read heads and other electrical/magnetic components on the trailing edge may be referred to as "magnetic recording heads" or simply "heads", unless specificity is otherwise required. Next, the sliders are blocked and shaped by lapping to form the ABS. The method of the present invention is carried out after lapping in order to further refine the topography to the desired conformation. Further, lapping can cause undesirable effects such as smearing of the metal material that makes up the magnetic recording heads. Smearing can cause shorts in the shields and poletips, and thus result in poor performance. The ion-milling method of the present invention will also correct this problem. The desired topography of the trailing edge will depend upon the ultimate end use of the slider. The invention can be performed in a batch process where many sliders are manufactured at once, such as in an uncut wafer of sliders.

Figure 4:
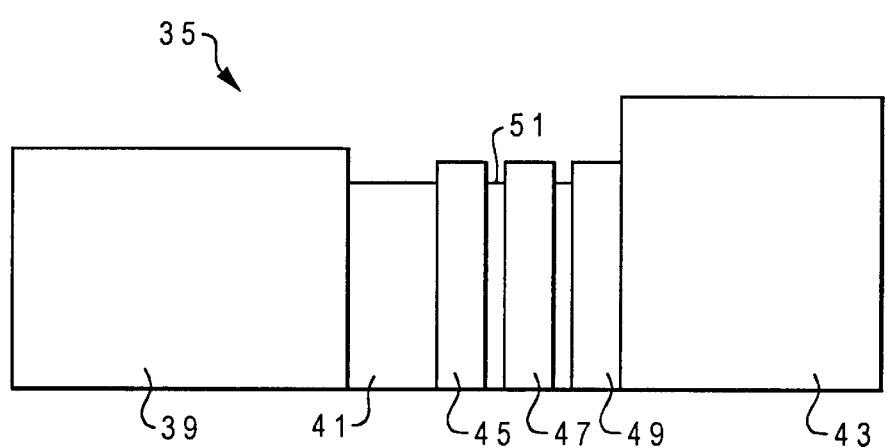
FIG. 4 is a cross-sectional view of the head region of the slider in FIG. 3.
Figure 2:
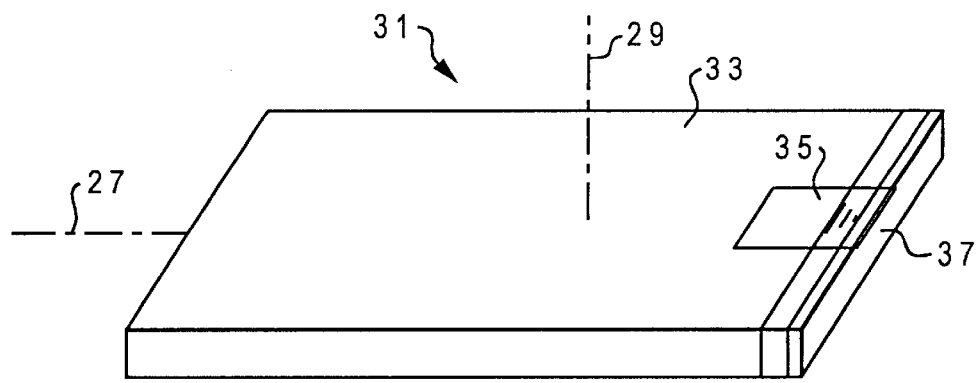
FIG. 2 is a stylized perspective view of an unfinished slider prior to lapping and ion milling.
Figure 3:
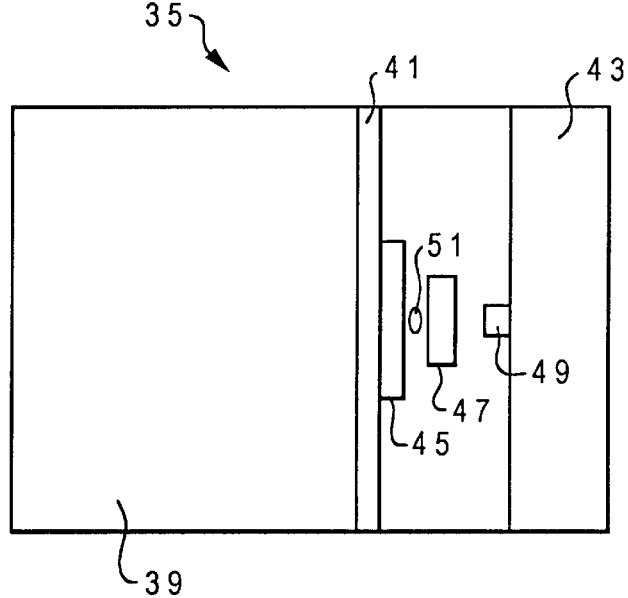
FIG. 3 is a top, closeup view of the head region of the slider in FIG. 2.

The topography of the head region of a slider is shown with reference to FIGS. 2–4 which deletes some of the details in FIG. 1 for simplicity. Referring to FIGS. 2–4, the topography of the slider is characterized by raised and depressed regions on the head 35 of slider 31 that are formed due to the lapping process. The head region 35 is adjacent to the trailing edge 37 of the slider. The head region 35 is made from layers of differing materials as shown in cross section in FIG. 4. The substrate section 39 is continuous with the substrate surface 33 in the present embodiment and is made from $Al_2O_3$—TiC, while having an alumina undercoat 41 (UC) and alumina overcoat 43 (OC). Between these layers 41 and 43 are the shield 1 or "S1" (45), shield 2/poletip 1 or "S2/P1" (47), and poletip 2 or "P2" (49). Finally, read head 51 is typically located between S1 and S2. The shields, poletip and read head may be made from such materials as Fe or Ni. The method of layering these materials into a slider and head are well known in the art.

Figure 5:
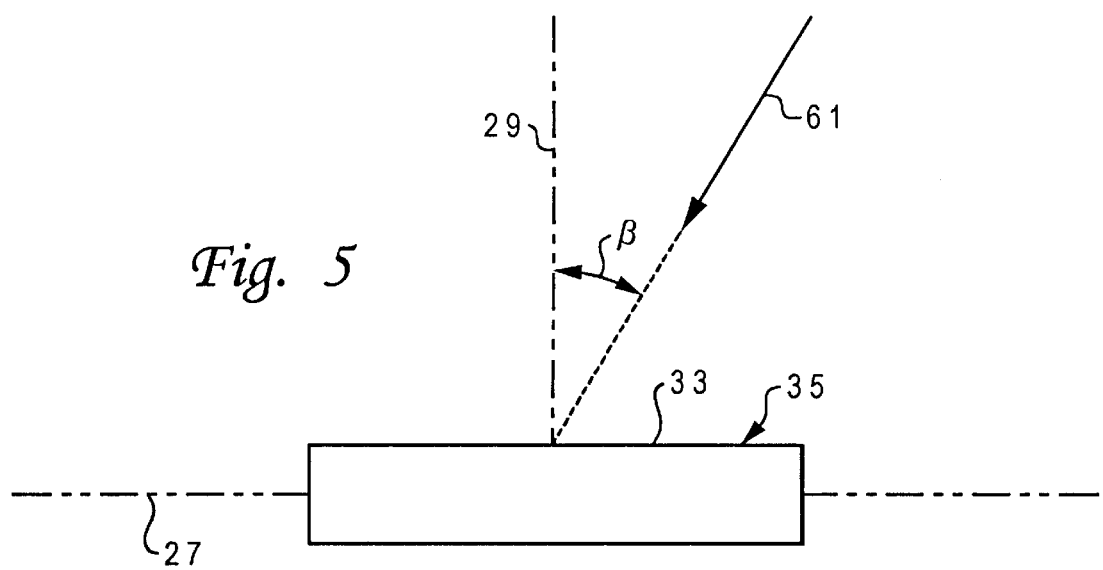
FIG. 5 shows the defined angles of incident ion beam, vertical axis, and parallel axis relative to the surface to be milled.

The method of altering the trailing edge topography of the lapped slider, and in particular a surface of a slider, by ion milling, is depicted in FIG. 5. The slider is placed upon a pallet such that the at least one substrate surface (the invention being equally applicable to a series of substrate surfaces as in an uncut wafer of sliders) is facing in the direction of the ion beam source. The ion beam emanates towards the surface at an angle relative to the vertical axis of the surface. Specifically, referring back to FIG. 5, the substrate surface of head 35 is being processed by the method of the invention, with the vertical axis 29 being perpendicular to the surface. The at least one surface of slider 31 to be processed is placed on a pallet (not shown) that can either remain stationary or rotate at a rate of between about 5 and 50 rpm. The slider also has a horizontal axis 27. The two axes are at a 90° angle to one another. The angle of incidence of ions irradiating from the source, or the milling angle, is defined by the angle formed between 29 and the incident vector 61. The milling angle ($\beta$ in FIG. 5) is typically between about 0° and 80°. Thus, the incident radiation hits the surface 33 at an angle to mill away the material on the surface after the lapping step.

The method of modifying the trailing edge is now described in more detail. In one embodiment of the invention, the substrate surface is on the pallet, the surface to be modified facing away from the pallet. The pallet is typically located within a chamber that can be evacuated for ion milling. Also, the pallet typically can rotate between about 5 and 50 rpm about its vertical axis to improve milling uniformity. Next, the slider or sliders to be modified are placed such that the substrate surface is facing generally towards the ion beam source.

Ions are generated by a hot filament or ion source being placed in the presence of an etchant gas, thus generating ion gas species. In the present embodiment, the ion species are generated from a gas such as Argon, or a mixture of Argon with Hydrogen, the Hydrogen ranging between about 0.1 percent and 6 percent of the total gas mixture. Other mixtures of etchant compounds can also be used such as Argon and $CHF_3$. Typically, the voltage of the source ranges between about 100 volts and 900 volts, and the current density ranges between about 0.1 and 1.0 $mA/cm^2$. The ions radiate from the source, thus creating a linear axis 61 originating from the source. The source is placed relative to the pallet and the surface to be shaped such that the linear axis forms a defined angle of incidence ($\beta$) or milling relative to the vertical axis 29 drawn perpendicular to the surface. As the ions impinge upon the surface, the pallet rotates, thus rotating the surface to be shaped. This allows an even and complete coverage of the impinging ions against the surface.

The amount of ion radiation, and hence the amount of milling, can be manipulated by controlling the ion beam current and voltage. Further, the time of exposure can vary from several seconds to several minutes, thus adding another variable that can be altered to define the topography of the head portion. The milling angle is another parameter that can be manipulated, a large milling angle (70° to 85°) being ideal for making relatively large changes in the level of the alumina relative to the magnetic recording heads, and a small milling angle (0° to 50°) being ideal to changing the topography of the magnetic recording head material relative to the alumina. Parameters such as beam voltage and beam current, milling angle, and time of exposure are the primary variables that control the degree of the ion milling process of the invention.

Further, the use of different materials having varying degrees of susceptibility to the milling process can be used to vary the topography. The different slider materials can be etched away by ion milling to further refine the topography of the slider after lapping the sliders. The rate of etching on a solid surface depends upon the nature of the material and the angle of incidence of the ions. For instance, at certain milling angles, the alumina is etched to a greater extent than the metal heads, and vice versa. The reference plane on which ions impinge is the substrate surface 33. Data shown in FIG. 6 illustrate this aspect of the invention.

Figure 6:
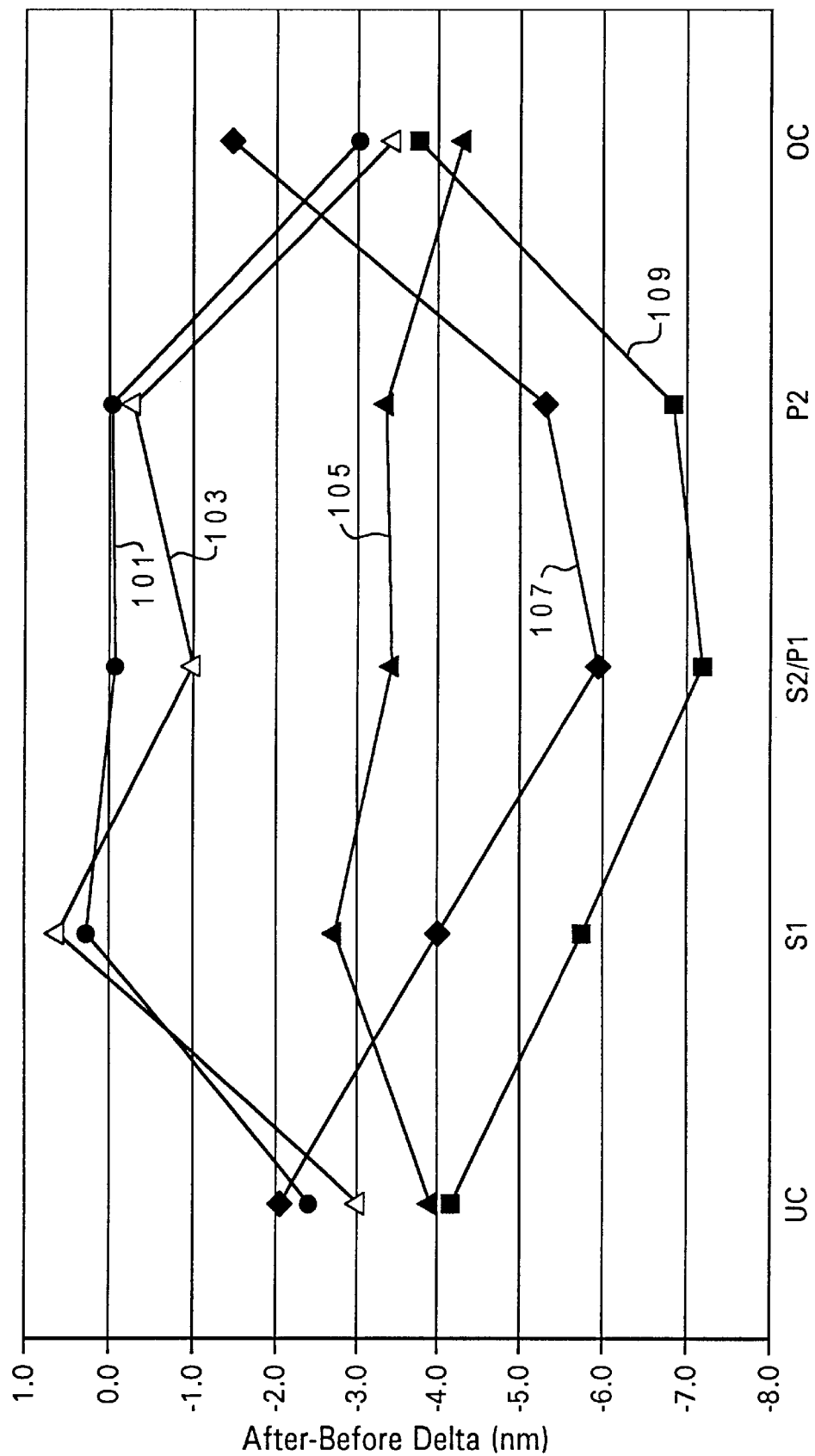
FIG. 6 is a graphical representation of data showing the results of the ion milling, the x-axis representing the various features of the trailing edge surface, and the y-axis representing the change in topography relative to the substrate surface for each feature of the head.

FIG. 6 is a graphical representation of some results of the method of milling the slider, describing how the level of the alumina undercoat (UC), S, S2/P1, and P2, and the alumina overcoat (OC) with respect to the substrate can change depending on the angle or the chemistry. Sliders were ion milled according to the invention at 11°, 40°, 60°, and 75° using Argon for 1 minute while the $CHF_3$+Argon parts were ion milled at 70° angle for 10 seconds, and then with only Argon for 10 additional seconds. The data reveal that the various head materials can be ion milled, the topography in each instance changing depending upon the angle of ion beam incidence.

At an incident angle $\beta$ of 75° (101), the shields and poletips were etched the least, showing almost no change in height relative to the substrate (y-axis, After-Before Delta (nm)). The milling process using $CHF_3$ at a milling angle of 70° (103, or $\beta$) showed similar results, although the time of exposure was only 10 seconds, followed by a 10 second exposure to just an Argon ion stream. Presumably, $CHF_3$ is chemically active, especially when ionized, and hence, a stronger chemical etchant of alumina relative to Argon. In both 101 and 103 cases, the alumina undercoat and overcoat was etched by 2 to 3 nm relative to the substrate surface. Etching at a milling angle $\beta$ of 60° (105) showed uniform etching of the shields, poletips, and alumina material. Finally, etching at 40° (109) and 11° (107) showed the greatest etching of the poletips and shields.

Figure 7:
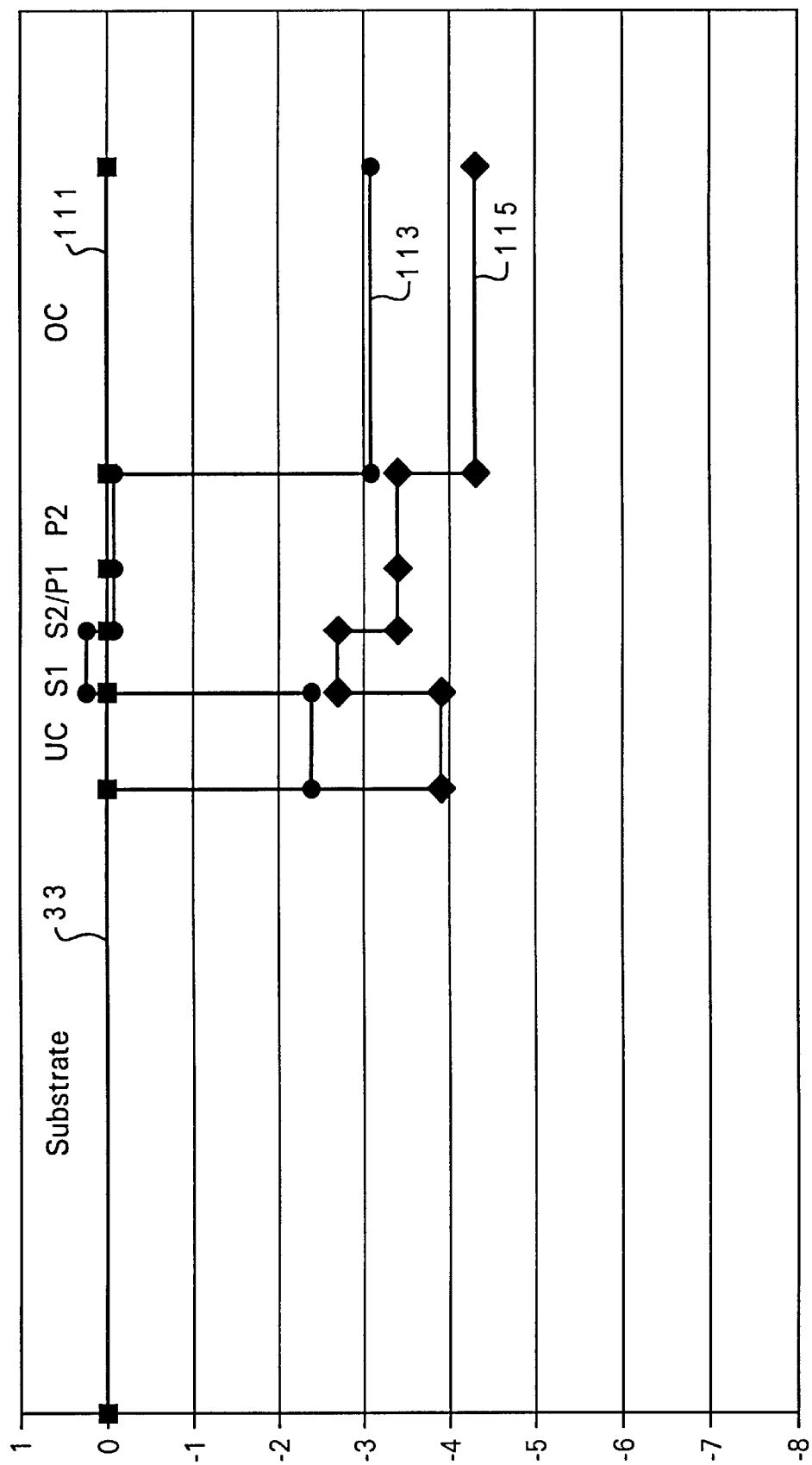
FIG. 7 is a graphical representation of a cross-section of a slider head region before and after ion milling, the x-axis representing the various features of the trailing edge surface, and the y-axis representing the relative heights of the slider head after ion milling for two milling angles.
Figure 8:
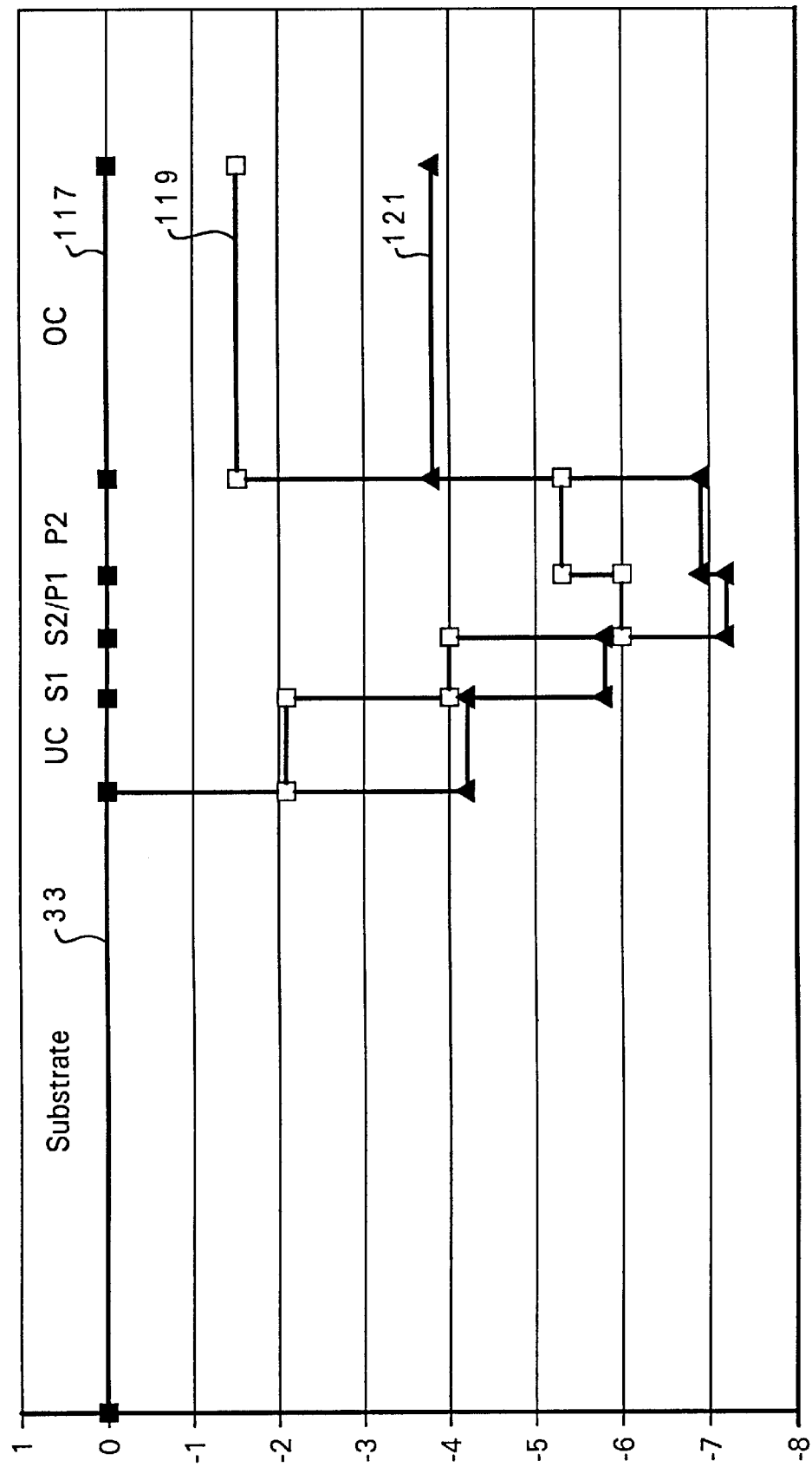
FIG. 8 is a graphical representation of a cross-section of a slider head region before and after ion milling, the x-axis representing the various features of the trailing edge surface, and the y-axis representing the relative heights of the slider head after ion milling for two other milling angles.

A more schematic depiction of these results is shown in FIG. 7 and FIG. 8. These figures show a cross-section of the slider head as in FIG. 4 under the various conditions of ion milling. FIG. 7 shows the dramatic difference between the milling angle of 60° and 75°. In this example, there is little to no topography after lapping (111) alone. The highest milling angle of 75° (113) removed a large amount of the alumina relative to the transducers S1, S2/P1, and P2. However, the 60° (115) milling angle $\beta$ removed the largest amount of material, both alumina and transducer material. FIG. 8 shows that the smaller milling angles $\beta$ etch away the head and slider material even further. Relative to the topography after lapping (117), the 11° angle (119) decreased the height of the transducers relative to the substrate surface, while the 40° milling angle showed the most etching, decreasing the transducer heights by 7 nm relative to the substrate surface.

The method of ion milling to shape the topography of a slider has the major advantage of improving the thermal asperity (TA) sensitivity of the MR read head 51. A TA event occurs when the read sensor makes physical contact with the moving disk during operation. If the read head protrudes from the slider, then there is a greater likelihood that it will contact the disk. A TA event causes the resistance of the MR magnetic heads to change dramatically which degrades the head performance. Thus, it is desirable to decrease the exposure of the read head in order to decrease the TA. Altering the topography of the heads relative to the substrate can increase the stability of the read head and thus improve the read/write function of the slider head. The method of the present invention can selectively change the topography of the region around the magnetic recording heads to improve the TA sensitivity. Depending upon the exact composition of materials used, the milling angle β can be selected to achieve an optimal topography for the slider head.

Another advantage to the present method is that it can be used in a batch process. A complete wafer of sliders can be placed on the pallet, and the method carried out such that each slider trailing edge is exposed to the desired ion milling process.

Further, a two step process can be performed to both change the topography of the head and trailing edge and to clean the surface. The first step in the process is primarily a topography-altering step, wherein a small milling angle (0° to 50°) is used to change the topography to a relatively large extent as described above. The second step would be to ion-mill the substrate at a large milling angle (70° to 80°) in order to clean the surface in preparation for coating the surface with a layer of carbon.

Another advantage to the present invention is that the method can be used to reduce and/or remove smearing of magnetic head material. As a result of the lapping process, magnetic head material can often smear across the trailing edge, often causing a short-circuit between poletips, etc. It is desirable to remove this smearing. Depending upon the smear material, a milling angle can be chosen to remove the smearing. Also, the smear may be removed during the process of changing the topography of the surface at most any milling angle.

While the invention has been particularly shown and described with reference to a preferred embodiment, it will be understood by those skilled in the art that various changes in form and detail may be made therein without departing from the spirit and scope of the invention.

What is claimed is:

1. A method of ion milling a trailing edge of a slider, the slider having a substrate surface, at least one magnetic recording head imbedded in an alumina undercoat, and a vertical axis relative to the substrate surface, the method comprising:

applying an alumina overcoat to at least the trailing edge;

lapping at least the trailing edge of the slider;

generating an ion beam using an etchant gas; and exposing the trailing edge of the slider at least once to the ion beam at a predetermined milling angle for a predetermined time, the milling angle being the angle made by the ion beam relative to the vertical axis; and wherein the milling angle is chosen to alter the topography of the trailing edge to a desired conformation by differentially etching away the magnetic recording head material to a greater extent than the alumina undercoat and the alumina overcoat.

2. The method of claim 1, wherein the milling angle is between 0° and 50°.

3. The method of claim 1, wherein the topography of the trailing edge is altered to improve the thermal asperity sensitivity of the slider.

4. The method of claim 1, wherein the beam of radiation ranges between about 100 and 900 volts.

5. The method of claim 1, wherein the beam of radiation ranges between about 0.1 and 1.0 $mA/cm^2$ current density.

6. The method of claim 1, wherein the slider is placed on a pallet that rotates about the vertical axis of the surface.

7. The method of claim 6, wherein the rate of rotation of the pallet ranges between about 5 and 50 rpm.

8. The method of claim 1, wherein the etchant gas is Argon.

9. The method of claim 1, wherein the etchant gas is a mixture of Argon and Hydrogen.

10. The method of claim 1, wherein the etchant gas is a mixture of Argon and $CHF_3$.

11. A method of ion milling a trailing edge of a slider, the slider having a substrate surface, at least one magnetic recording head imbedded in an alumina undercoat, and a vertical axis relative to the substrate surface, the method comprising:

applying an alumina overcoat to at least the trailing edge;

lapping at least the trailing edge of the slider;

generating an ion beam using an etchant gas;

exposing the trailing edge of the slider at least once to the ion beam at a milling angle chosen to alter the topography of the trailing edge to a desired conformation by differentially etching away the magnetic recording head material to a greater extent than the alumina undercoat and the alumina overcoat, the milling angle being the angle made by the ion beam relative to the vertical axis and being between 0° and 50°; and then exposing the trailing edge of the slider at least once to the ion beam at a milling angle of 70° to 80° to clean the substrate surface.

12. The method of claim 11, wherein the topography of the trailing edge is altered to improve the thermal asperity sensitivity of the slider.

13. The method of claim 11, wherein the beam of radiation ranges between about 100 and 900 volts.

14. The method of claim 11, wherein the beam of radiation ranges between about 0.1 and 1.0 $mA/cm^2$ current density.

15. The method of claim 11, wherein the slider is placed on a pallet that rotates about the vertical axis of the surface.

16. The method of claim 15, wherein the rate of rotation of the pallet ranges between about 5 and 50 rpm.

17. The method of claim 11, wherein the etchant gas is Argon.

18. The method of claim 11, wherein the etchant gas is a mixture of Argon and Hydrogen.

19. The method of claim 11, wherein the etchant gas is a mixture of Argon and $CHF_3$.

* * * * *

UNITED STATES PATENT AND TRADEMARK OFFICE
CERTIFICATE OF CORRECTION

PATENT NO.     : 6,423,240 B1
DATED          : July 23, 2002
INVENTOR(S)    : Wang et al.

It is certified that error appears in the above-identified patent and that said Letters Patent is hereby corrected as shown below:

<u>Column 1,</u>
Lines 5-6, after the word "application" please add -- 09/468,603 --

Signed and Sealed this

Fifth Day of November, 2002

Attest:

Attesting Officer

JAMES E. ROGAN
Director of the United States Patent and Trademark Office